Patented July 5, 1927.

1,634,310

UNITED STATES PATENT OFFICE.

JOKICHI TAKAMINE, JR., AND NOBUCHIKA FUJITA, OF CLIFTON, NEW JERSEY.

PROCESS OF MAKING A YEAST STIMULANT.

No Drawing.  Application filed July 25, 1922. Serial No. 577,446.

Our present invention consists of a new process of making a stimulant or food for yeast. We are thus enabled to obtain from a comparatively cheap substance, bran, a product of great value.

We have also discovered that when this yeast stimulant is added in the process of making bread, it stimulates the growth of yeast and produces a loaf of bread of superior qualities, including greater volume and finer texture, with excellent bloom, color and taste.

For producing this product, we first make an extract of bran, preferably by the following method: A mixture is made in the proportions of 5 ounces of bran and 40 ounces of water, and is boiled for 1 hour, with stirring. The effect of this boiling will be to thoroughly disintegrate the cellular structure of the bran whereby practically the entire soluble portions of the bran will be released or made easily available for such special dissolvents, such as enzymes, as will be hereinafter mentioned. It then appears as a brownish yellow turbid mass. This is then filtered to remove the fibre and insoluble proteins. The resulting bran extract might then, after cooling, be used in breadmaking without further treatment, but, in practice, we prefer to evaporate it to about one-sixth its volume; producing from the above quantities about 5 ounces of concentrated bran extract. By still further evaporation, the product may be reduced to solid form.

This extract contains the constituents of bran nutritive for yeast, including phosphate compounds, soluble proteins, organic nitrogenous compounds, soluble carbohydrates, and potassium salts. The phosphate compounds include both the organic and inorganic calcium and magnesium salts. All of these constituents have a stimulating action upon yeast, bringing about, in the manufacture of leavened bread, a more speedy fermentation, allowing for the reduction of yeast, sugar, and other sweetening matter, at the same time producing a better loaf of bread.

We have ascertained that when this product is concentrated to a thick, syrupy consistency, its properties are not impaired, and that for preservation, fillers, such as cane, invert or glucose sugars, or other suitable preservatives, may be added or used. Since middlings contain bran, they may be substituted for it to a greater or less extent, with corresponding loss in economy.

We have further discovered that the efficiency of the above described bran extract may be increased by adding to it a small amount (say, 1 per cent) of a diastatic enzyme which quickly convert the gelatinized starch of the extract into soluble carbohydrates, dextrine and sugar, which add increased nutriment for fermentation and, at the same time, facilitate filtration. When this addition is made, the bran extract should be at from 45 to 60 degrees C., and the addition is preferably made before filtration, though it may be made after. The water employed for making the bran extract may be slightly acidulated, as by .2 of 1 per cent of hydrochloric acid. The bran or middlings may be from various cereals, such as wheat and rice.

For the diastatic enzyme here mentioned, we employ a substance which has been made by a special process to contain substantially no proteoclastic enzyme. Any diastatic solution or extract, whether made of malt or koji (i. e., a culture of *Aspergillus oryzæ* on a suitable medium), is always accompanied with some proteoclastic enzyme. The activity of the latter, however, is small compared to that of the former.

In carrying out our process for producing the stimulant of yeast, the presence of the proteoclastic enzyme is undesirable. Therefore the same should be removed. To accomplish this we take any diastatic solution of malt or koji, preferably at a concentration of 10 per cent measured by the Balling sacharometer, and add thereto gradually, with vigorous stirring, a solution of a soluble salt of alkaline earths or metals non-injurious to health, such as calcium chloride, iron sulphate, aluminum chloride, etc., until no more precipitation takes place. It is then filtered by any known method and the precipitate is removed. It will then be found that a considerable part of diastatic activity has been carried off with the precipitate removed. It often amounts to 50 per cent of the former activity. With this loss of diastatic power, the activity of proteoclastic enzyme is also got rid of but to a relatively greater degree than the diastatic. Thus the proteoclastic activity has been brought down to so insignificant a degree as to be negligible, since the presence of same in any diastatic solution is always and invariably very small compared to the diastatic activity.

If however, a still further removal of the proteolytic enzyme is desired, the solution obtained as above is subjected to a concentration in vacuum at a temperature near but not exceeding 60 degrees C. and concentrated to about one-fifth of its original volume. The above conditions, combined with the increase of acidity in the extract as it is concentrated, destroy further the activity of enzymes present but particularly the proteoclastic. When the concentration is accomplished, it will be found that the activity of proteoclastic enzymes is practically destroyed. It is, of course, true that some destroying effect upon the diastatic activity is exerted, yet, as it preponderates so greatly over the proteolitic, enough diastatic activity remains in the extract to perform the desired function. For carrying out the fractional destruction of different enzymes, the density of the extract is not limited, but the above is preferred for convenience.

While the proteoclastic enzymes may be removed prior to the addition of the enzyme-substance to the bran extract, we find it of some advantage to carry out the separation of the proteoclastic enzymes after the enzymes material has been added to the bran extract, as in this way the proteoclastic enzymes are allowed to render soluble certain of the protein matters in the bran before they are eliminated.

We have found that said bran extract may be advantageously used in bread-making as follows: A preliminary mixture is made in the proportion of 3 pounds of yeast in about 25 pounds of water, with the addition of 5 ounces of said concentrated bran extract and 3 pounds of sugar. 196 pounds (1 barrel) of flour are mixed in a dough mixer with 3 pounds of shortening and about 90 pounds of water, and to this is added the said preliminary mixture. The dough is then removed from the mixer and allowed to rise for about 2½ hours. It is then punched to remove as much carbon-dioxide gas as possible. It is then allowed to rise again for about 1 hour and is again punched. Then it is allowed to rise for about ½ hour, and after being again punched, is put in pans and allowed to rise for about 15 minutes. Whereupon it is put in the oven and baked for ½ hour at 400 degrees F. During the series of risings and punchings, it is at about 80 degrees F.

The above proportions are given by way of example, and will, of course, be varied to a very large extent.

We claim:

1. The process of manufacturing yeast stimulant, which consists in making a water decoction of bran, saccharifying and rendering water soluble the carbohydrates therein by means of an enzyme mixture rich in a diastatic enzyme and containing some proteoclastic enzymes, eliminating the proteoclastic enzymes, leaving a slight amount of the diastatic enzyme and separating the water soluble from the water insoluble material.

2. The process according to claim 1 in which koji is the enzyme mixture employed.

3. The steps in the process of making a yeast stimulant which consist in boiling a mixture of bran and water until a thorough disintegration of the cellular structure of the bran material is had and adding thereto a diastatic enzyme.

4. The steps in the process of making a yeast stimulant which consist in boiling a mixture of bran and water for at least one hour with stirring, and adding thereto a diastatic enzyme.

5. The steps in the process of making a yeast stimulant which consist in boiling a mixture of bran and water slightly acidulated with a mineral and until a thorough disintegration of the cellular structure of the bran material is had and adding thereto a diastatic enzyme.

JOKICHI TAKAMINE, Jr.
NOBUCHIKA FUJITA.